United States Patent [19]
von Helms et al.

[11] Patent Number: 5,632,461
[45] Date of Patent: May 27, 1997

[54] MOUNTING BRACKET

[75] Inventors: John S. von Helms, Park Ridge; Ronald H. Steinberg, Itasca, both of Ill.

[73] Assignee: Rent Com, Inc., Schiller Park, Ill.

[21] Appl. No.: 399,816

[22] Filed: Mar. 7, 1995

[51] Int. Cl.$^6$ ................................. A47B 96/06
[52] U.S. Cl. ...................... 248/218.4; 248/230.8; 248/345.1
[58] Field of Search ............... 248/218.4, 219.1, 248/220.22, 229.17, 227.3, 230.8, 228.8, 230.9, 541, 345.1; 211/193

[56] References Cited

U.S. PATENT DOCUMENTS

| | | |
|---|---|---|
| 1,090,929 | 3/1914 | McFaddin .............. 248/230.8 |
| 1,221,507 | 4/1917 | Buesse .................. 248/229.17 |
| 1,796,093 | 3/1931 | Florman ................ 248/230.8 X |
| 2,663,531 | 12/1953 | Rubano ................. 248/229.17 |
| 3,012,750 | 12/1961 | Schermerhorn, Jr. . |
| 3,190,111 | 6/1965 | Trussell et al. ........ 248/219.1 X |
| 3,522,960 | 8/1970 | Moore .................... 248/230.9 X |
| 3,612,460 | 10/1971 | Smith . |
| 3,776,498 | 12/1973 | Peters et al. .......... 248/219.1 |
| 4,185,360 | 1/1980 | Prete, Jr. et al. . |
| 4,309,263 | 1/1982 | Boyd . |
| 4,324,022 | 4/1982 | Prete, Jr. . |
| 4,341,029 | 7/1982 | Heard . |
| 4,409,907 | 10/1983 | Norton . |
| 4,759,521 | 7/1988 | Aldridge et al. . |
| 4,917,338 | 4/1990 | Olson et al. . |
| 5,090,397 | 2/1992 | Larsen et al. . |
| 5,098,051 | 3/1992 | Aldridge et al. . |
| 5,423,281 | 6/1995 | Crookham et al. ..... 248/218.4 X |

FOREIGN PATENT DOCUMENTS 23672 of 1910 United Kingdom ............ 248/227.3

*Primary Examiner*—Korie Chan
*Attorney, Agent, or Firm*—Olson & Hierl, Ltd.

[57] ABSTRACT

A bracket for mounting a device to a pole or other structure includes an elongated channel bar, a pair of generally cylindrical pads mounted to the outside of each of the opposed sides of the channel bar, a buckle and strap assembly mounted to the channel bar for securing the device to the pole or other structure, and a cantilever arm extending from the channel bar for supporting the device to be mounted.

18 Claims, 2 Drawing Sheets

MOUNTING BRACKET

FIELD OF THE INVENTION

The present invention relates to a device for supporting instruments to a pole or the like.

BACKGROUND OF THE INVENTION

There are a variety of brackets and other devices that are known in the art for securing a device, such as, for example, lights, music speakers or television cameras, to a utility pole or any other pole structure. One of the shortcomings of the prior art brackets, however, is that they are designed for use with a specific type of pole or a pole having a specific shape, and therefore will not perform satisfactory with a different pole. For example, a bracket that is designed to secure to a utility pole having a circular cross section probably will not secure to a pole having a square or triangular cross section.

The need for a more versatile bracket is especially prevalent in certain industries that employ temporary structures. In the music, film and construction industries, for example, it is common to construct temporary structures which require various electrical instruments for sound, lighting, etc. In such applications, it would be advantageous to employ brackets that can secure to whatever poles or permanent structures that are already in place at the location to support the necessary instruments.

Accordingly, it is an object of the present invention to provide a bracket for supporting devices such as lights, speakers, and the like that can be used with virtually any type of pole or column.

It is a further object of the present invention to provide such a bracket that can be quickly and easily mounted to the pole or column.

It is a still further object of the present invention to provide such a device that is relatively light weight.

SUMMARY OF THE INVENTION

In accordance with these and other objects, a mounting bracket is provided for securing items to a post or column. In its preferred embodiment, the bracket comprises two pairs of concentric, cylindrical pads engaging the post or column mounted on opposite sides of a channel bar. The bracket is secured to the post or column in any suitable manner such as by a buckle and strap arrangement mounted to the back of the channel bar. The pads on each side of the channel bar are separated by a space for receiving the strap.

A cantilever arm extends from the channel bar and can be used for supporting the device. If desired, hardware can be provided on the cantilever arm for securing the device. In the preferred embodiment, a thumbscrew is threadedly mounted near the proximal end of the cantilever arm, and a mounting post, such as a roller, is mounted near the distal end of the cantilever arm. The thumbscrew can be used to mount a U bracket, for example, which can be secured, in turn, to the device. The mounting post can be used to secure cables or wires that lead to the device.

The present invention provides a bracket that can be secured to virtually any type of pole or column. The bracket can be quickly and easily mounted to the pole or column by placing the open side of the channel bar against the pole or structure, extending the strap around the pole or structure, securing the strap to the buckle, and tensioning the strap. Additionally, the bracket is relatively light in weight because, among other reasons, the channel bar and the cantilever arm, as well as the cylindrical pads can be made hollow.

BRIEF DESCRIPTION OF THE DRAWINGS

The present invention and the advantages thereof will become more apparent upon consideration of the following detailed description when taken in conjunction with the accompanying

DETAILED DESCRIPTION OF THE PREFERRED EMBODIMENT

Figure 1:
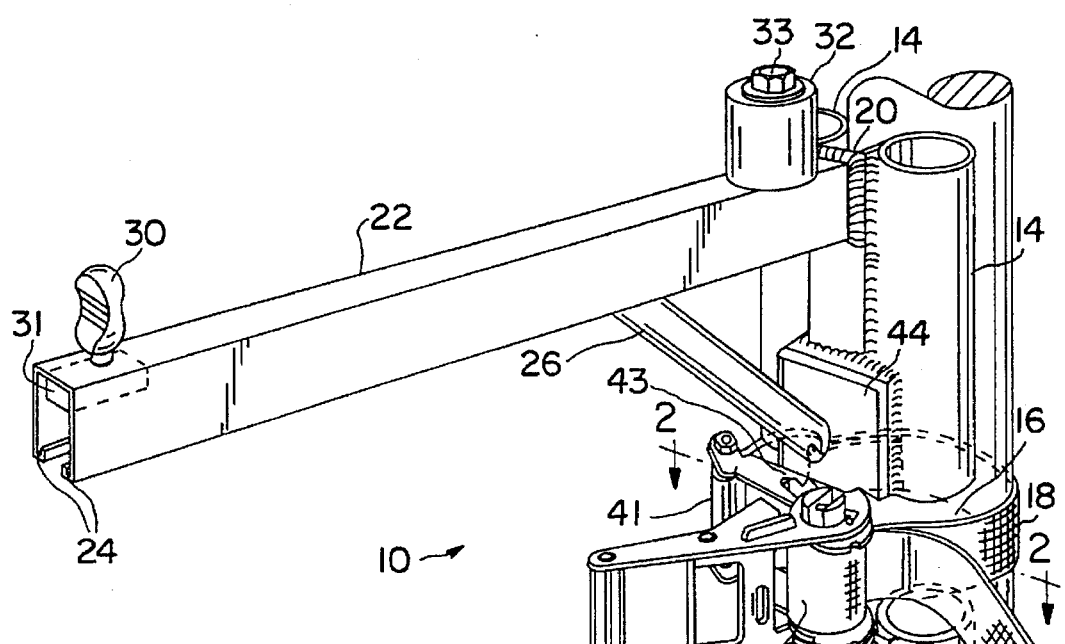
FIG. 1 is a perspective of a bracket in accordance with the preferred embodiment of the invention, shown secured to a generally cylindrical pole.

Referring to FIGS. 1–5, a mounting bracket 10 in accordance with a preferred embodiment of the invention is shown comprising a channel bar 12 having a substantially rectangular cross-section and two pairs of hollow, concentric, cylindrical pads 14 mounted on the outer surface of the opposite sides of the channel bar and extending substantially parallel to the channel bar. The pads 14 on each side of the channel bar 12 are spaced from one another to define a space or gap 16 that is sufficient to receive a strap 18, as hereinafter described.

In accordance with the preferred embodiment of the invention, the outer diameter of each pad 14 is approximately 25% larger than the width of the channel 20 defined by the channel bar 12. The arcuate length of each pad 14 that extends outward from the rail 12 is preferably in the range of about 120–200 degrees, with the most desirable length being about 180 degrees of an arc.

A cantilever arm 22 extends, preferably perpendicularly, from one end of the closed back side of the channel bar 12. The cantilever arm may be U-shaped or C-shaped in cross-section, or hollow, to reduce the weight of the cantilever arm while conserving its load carrying ability. In addition, each of the leading edges of the sides of the cantilever arm 22 extends slightly inwardly and then back up into the channel 20 to define a pair of longitudinal slots 24 for slidingly receiving a bracket or other hardware for use in securing the desired device to the mounting bracket. If desired, a support rod 26 can extend at an acute angle relative to the channel bar 12 from the back of the bar 12 to the cantilever arm 22 so as to provide additional support for the cantilever.

A thumbscrew 30 may be threadedly mounted to the top of the cantilever arm 22 for use in mounting the desired device or devices to the bracket. For example, the thumbscrew 30 can be used to secure a U-bracket to the cantilever 22, and the device can be then be mounted directly to the U-bracket. In the illustrated embodiment, a boss 31 is welded to the U-shaped cantilever within the channel, and the thumbscrew is threadingly engaged with the boss (see FIG. 1).

In addition, a mounting post such as a roller 32 may be secured to the top of the cantilever arm by, for example, a fastener 33 for use in securing the cables, wires or leads to the mounted devices, if desired. A hook or peg shaped member 34 may also be mounted to the back of the channel bar 12, which member also can be used as the principal or an auxiliary support for the device to be mounted.

In addition, an aperture 36 may be formed in the channel bar 12 to provide further means for supporting a device. In the illustrated embodiment, for example, the aperture 36 is shown near the end of the rail opposite cantilever 22 (see FIG. 1).

A buckle assembly 40 is provided for securing the strap to the rail. The buckle assembly 40 comprises a buckle 41 secured to the leading end of the strap 18 and a base 43 mounted to the back of the rail 12, preferably near the middle. The base 43 is operably attached to the strap 18 by a spool 42 or the like. The buckle assembly 40 may be of any suitable construction, but, in the preferred embodiment of the invention, the buckle is of the type described in U.S. Patent No. 4,324,022 or 4,185,360, both of which are incorporated herein by reference.

If desired, a reinforcement plate may 44 be welded to the back of channel bar 12, and the buckle assembly 40 and rod 26 may be welded directly to the plate. In the illustrated embodiment, for example, the plate 44 is generally C-shaped, with the top and bottom of the plate being welded to the back of the rail 12 and to the backs of the cylindrical pads 14.

In operation, the bracket 10 is first positioned against a pole, column or other structure by placing the open side of the channel bar 12 against the pole so that the pads 14 are in contact with the pole and a portion of the pole extends into the channel defined by the channel bar. The buckle 41 and the leading end of the strap 18 is pulled from the buckle assembly 40 and extended around the pole. The buckle 41 is then secured to the base 43. The device to be supported by the bracket 10 is secured to the bracket by any suitable means, such as by the means described above.

Figure 2:
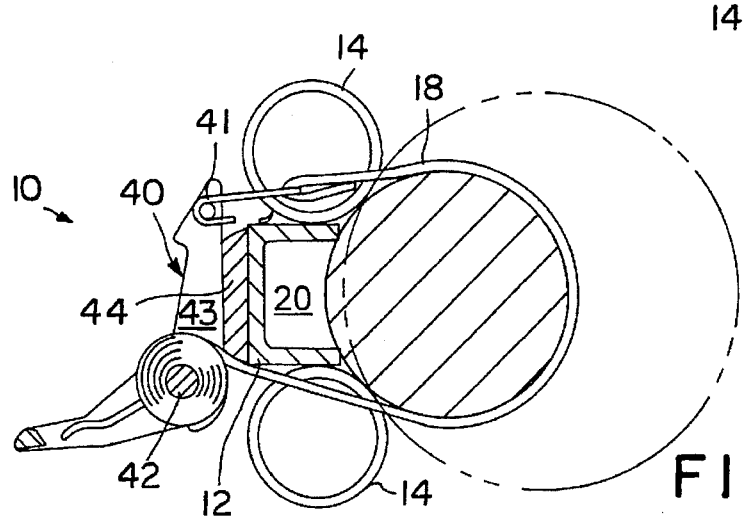
FIG. 2 is a section view taken along the plane 2—2 of FIG. 1.
Figure 3:
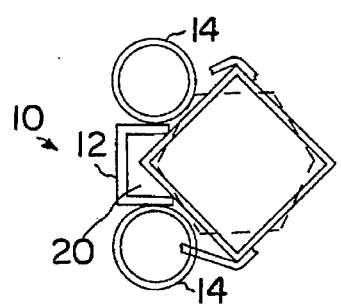
FIG. 3 is a top view of the bracket of FIGS. 1 and 2, shown secured to a pole having a square cross section.
Figure 4:
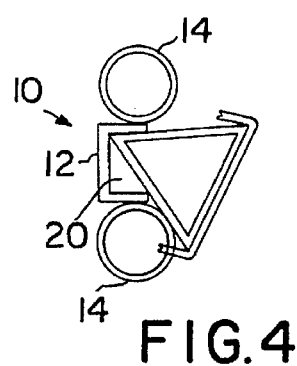
FIG. 4 is a top view of the bracket of FIGS. 1 and 2, shown secured to a pole having a triangular cross section.
Figure 5:
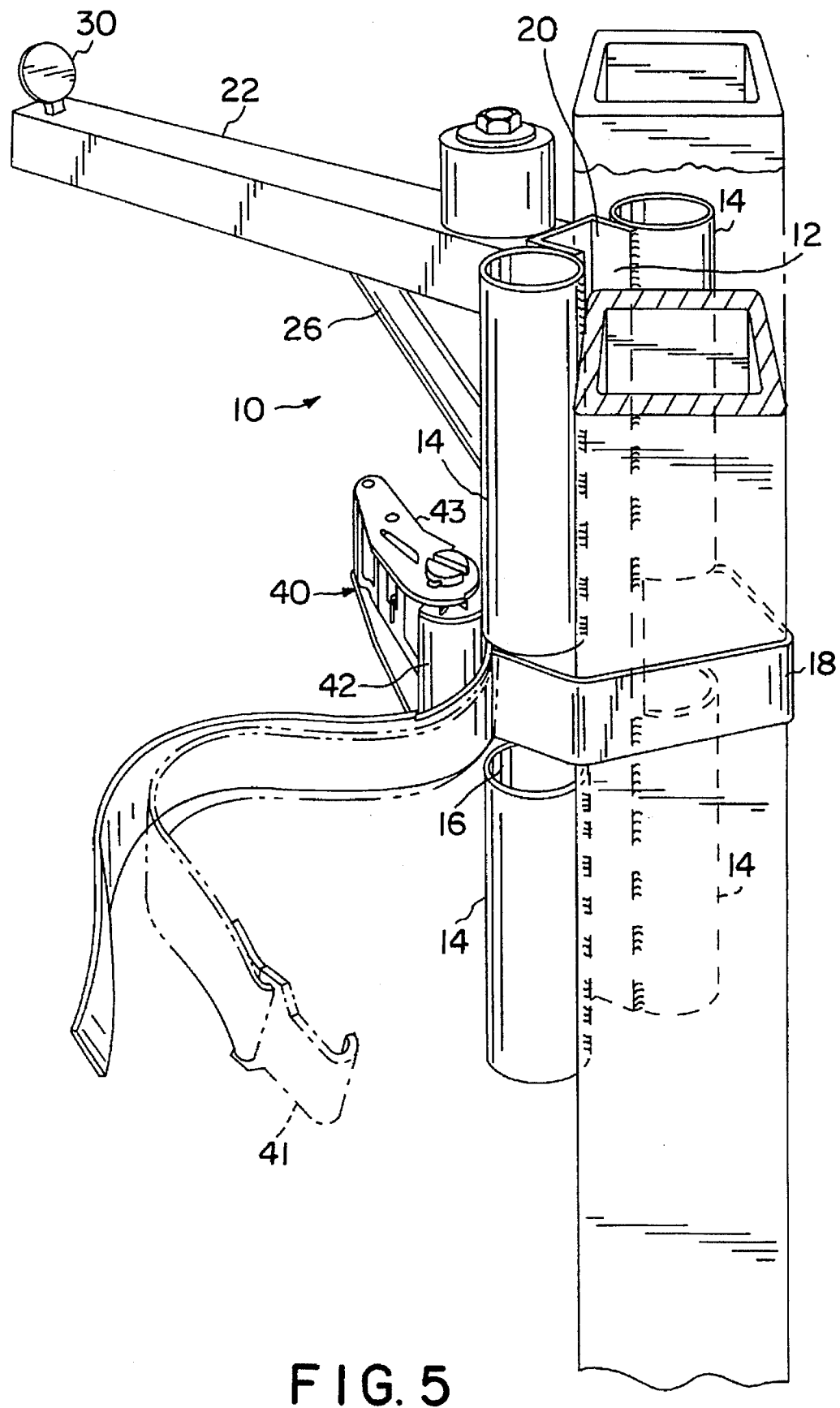
FIG. 5 is a is a different perspective of the bracket of FIGS. 1–3, illustrating the bracket secured to a pole, shown in broken view, having a square cross section, and also illustrating with broken lines the strap in its unsecured state.

Because of its construction, the bracket is securable to virtually any type of pole: in FIGS. 1 and 2, for example, the bracket 10 is shown secured to a pole having a circular cross section; in FIGS. 2 and 5, the bracket is shown secured to a pole having a square cross section; and, in FIG. 4, the bracket is shown secured to a pole having a triangular cross section.

The foregoing description is for purposes of illustration only and is not intended to limit the scope of protection accorded this invention. The scope of protection is to be measured by the following claims, which should be interpreted as broadly as the inventive contribution permits.

We claim:

1. A bracket for mounting a device to a pole or other upright structure and comprising a channel bar having an open side and a closed side, a plurality of generally cylindrical pads mounted to the outer surface of the channel bar opposite one another, a buckle assembly mounted to the channel bar for securing the bracket to the pole or other structure, a strap operably attached to the buckle assembly and of sufficient length to wrap around the pole or other structure, a cantilever arm extending from the channel bar for receiving the device; the pads being adapted to engage the pole or other structure when the channel bar is positioned against the pole or other structure.

2. The bracket of claim 1 wherein the channel bar has an angular cross-section.

3. A bracket for mounting a device to a pole or other upright structure and comprising a channel bar having an open side and a closed side, at least two pairs of generally cylindrical pads being mounted to the channel bar opposite one another, a buckle assembly mounted to the channel bar for securing the bracket to the pole or other structure, a strap operably attached to the buckle assembly and of sufficient length to wrap around the pole or other structure, each pair of pads being in a spaced relationship relative to one another at a distance sufficient to receive therebetween said strap, a cantilever arm extending from the channel bar for receiving the device; the pads being adapted to engage the pole or other structure when the channel bar is positioned against the pole or other structure.

4. The bracket of claim 3 wherein the cylindrical pads are hollow, extend generally parallel to the channel bar, and the pads on the same side of the channel bar are generally concentric and of substantially the same outside diameter.

5. The bracket of claim 4 wherein the outer diameter of the cylindrical pads is about 20% to about 30% greater than the width of the channel bar.

6. The bracket of claim 4 wherein the outer diameter of the cylindrical pads is approximately 25% greater than the width of the channel bar.

7. The bracket of claim 4 wherein a portion of each of opposed cylindrical pads extends beyond the open side of the channel bar.

8. The bracket of claim 7 wherein the arcuate length of the portions of the cylindrical pads extending beyond the open side of the channel bar is in the range of 120 to 200 degrees of an arc.

9. A bracket for mounting a device to a pole or other upright structure and comprising a channel bar having an open side and a closed side, at least two pairs of generally cylindrical pads being mounted to the channel bar opposite one another, a buckle assembly mounted to the channel bar for securing the bracket to the pole or other structure, a strap operably attached to the buckle assembly and of sufficient length to wrap around the pole or other structure, each pair of pads being in a spaced relationship relative to one another and the pairs of pads together defining a gap therebetween for receiving the strap, a cantilever arm extending from the channel bar for receiving the device; the pads being adapted to engage the pole or other structure when the channel bar is positioned against the pole or other structure.

10. The bracket of claim 9 wherein the buckle assembly is mounted to the closed side of the channel bar adjacent the gap.

11. The bracket of claim 1 wherein the channel bar is elongate, the cantilever arm extending substantially perpendicularly outwardly from and unitary with one end of the closed side of the elongate channel bar.

12. The bracket of claim 1 wherein a thumbscrew is threadedly mounted to the top of the cantilever arm for securing the device to the cantilever arm.

13. The bracket of claim 12 wherein a mounting post is secured to the top of the cantilever arm near the proximal end of the cantilever arm.

14. The bracket of claim 13 wherein the mounting post is a roller.

15. The bracket of claim 1 further comprising a support rod extending at an acute angle between the closed side of the channel bar and an intermediate region of the cantilever arm.

16. The bracket of claim 1 wherein the cantilever arm includes a pair of longitudinal slots and an open channel adapted to receive slidingly therewithin hardware for supporting the device to be mounted.

17. The bracket of claim 1 further comprising a hook member extending from the closed side of the channel bar for supporting the device.

18. The bracket of claim 2 further comprising a support plate welded to the closed side of the channel bar, and wherein the cylindrical pads and the buckle assembly are welded to the support plate.

* * * * *